United States Patent
Dykes et al.

(10) Patent No.: US 6,438,526 B1
(45) Date of Patent: Aug. 20, 2002

(54) SYSTEM AND METHOD FOR TRANSMITTING AND PROCESSING LOAN DATA

(76) Inventors: Frederick T. Dykes, 11109 Richland Val. Dr., Great Falls, VA (US) 22066; Richard J. Heiston, 5142 Winding Woods Dr., Centreville, VA (US) 20120

( * ) Notice: Subject to any disclaimer, the term of this patent is extended or adjusted under 35 U.S.C. 154(b) by 0 days.

(21) Appl. No.: 09/277,771

(22) Filed: Mar. 29, 1999

Related U.S. Application Data

(60) Provisional application No. 60/099,665, filed on Sep. 9, 1998.

(51) Int. Cl.[7] ............................................. G06F 17/60
(52) U.S. Cl. ............................. 705/38; 705/35; 705/37
(58) Field of Search .............................. 705/38, 35, 37

(56) References Cited

U.S. PATENT DOCUMENTS

| | | |
|---|---|---|
| 4,194,242 A | 3/1980 | Robbins |
| 4,876,648 A | 10/1989 | Lloyd |
| 5,239,462 A | 8/1993 | Jones et al. |
| 5,523,942 A | 6/1996 | Tyler et al. |
| 5,611,052 A | 3/1997 | Dykstra et al. |
| 5,673,402 A | 9/1997 | Ryan et al. |
| 5,699,527 A * | 12/1997 | Davidson ............... 705/38 |
| 5,742,775 A | 4/1998 | King |
| 5,765,144 A | 6/1998 | Larche et al. |
| 5,797,133 A * | 8/1998 | Jones et al. ............ 705/35 |

(List continued on next page.)

FOREIGN PATENT DOCUMENTS

| | | | | |
|---|---|---|---|---|
| JP | 10149399 A | * | 6/1998 | ........... G06F/19/00 |
| JP | 10187809 A | * | 7/1998 | ......... G06F/017/60 |
| ZA | 9602679 A | * | 12/1996 | ......... G06F/000/00 |

OTHER PUBLICATIONS

Pietrucha, Bill, "Quicken Mortgage Passes 10,000 Online Submissions", Newbytes News Network; Stillwater; Mar. 04, 1998 [extracted on on–line on Apr. 30, 2001] from Proquest database: http://proquest.umi.com/pqdwweb.*

Moyer, Liz, "Four Banks Cast Wider Lending Net with Competitive Bidding Web Site Series:6", American Banker; New York; Mar. 6, 1998 [extracted on on–line on Apr. 30, 2001] from Proquest database: http://proquest.umi.com/pqdweb.*

Press–Release: "Countrywide Home Loans Now Offers Online Center for First–Time Home Buyers", (www.prnewswire.com), May 15, 1998, extracted on–line on Apr. 30, 2001.*

(List continued on next page.)

*Primary Examiner*—Wynn Coggins
*Assistant Examiner*—Yogesh C. Garg
(74) *Attorney, Agent, or Firm*—Greenberg Traurig

(57) ABSTRACT

An automated system for collecting and disseminating loan information over a network connection includes a server which receives loan data, including daily loan data, from lenders and stores the loan data in a database. A web server provides to users (e.g., brokers, correspondents, or retail loan customers) interactive web content including loan information and a list of loan criteria which would affect the quoted points, rate, cap, or margin associated with a particular loan. The web server receives a user's applicable loan criteria selected from the list of possible loan criteria. And uses that applicable loan criteria and the loan data from the lender to create a list of adjustments to the points, rate, cap or margin. A quoted interest rate and the list of applicable adustments are transmitted by the web server to the user.

8 Claims, 29 Drawing Sheets

Microfiche Appendix Included
(1 Microfiche, 72 Pages)

U.S. PATENT DOCUMENTS

| | | | | | |
|---|---|---|---|---|---|
| 5,870,721 | A | * | 2/1999 | Norris | 705/35 |
| 5,930,776 | A | * | 7/1999 | Dykstra et al. | 705/35 |
| 5,940,812 | A | * | 8/1999 | Tengel et al. | 705/38 |
| 5,995,947 | A | * | 11/1999 | Fraser et al. | 705/35 |
| 6,076,072 | A | * | 6/2000 | Libman | 705/34 |
| 6,088,686 | A | * | 7/2000 | Walker et al. | 705/38 |
| 6,105,007 | A | * | 8/2000 | Norris | 705/38 |
| 6,289,319 | B1 | * | 9/2001 | Lockwood | 705/35 |

OTHER PUBLICATIONS

Wise, Christy, "Three strategies", Mortgage Banking; Washington; Apr., 1998, vol. 58, Issue 7, Start p: 24–30, [extracted on–line on Apr. 30, 2001] from Proquest database http://proquest.umi.com/pqdweb.*

Anonymous, "Freddie Goldworks users will have an acess to IMX matchmaker", National Mortgage News; New York; Aiu 17, 1998, vol. 22, Issue 47, Start p: 47 [extratced on–line on Nov. 22, 2001] from Proquest database http://proquest.umi.com/pqdw.*

Clayton, Michelle, "Examining electronic mortgage networks", America's Community Banker; Washington; Jul. 1998, vol. 7, Issue: 7, Start p: 14–20 [extracted on–line on Apr. 30, 2001]from Proquest database http://proquest.umi.com/pqdw.*

Sindell, Kathleen, "Online lending—not business as usual", Mortgage Banking; Washington; Aug. 1998; vol. 58, Issue: 11, Start p: 36–44 [extratced on–line on Apr. 30, 2001] from Proquest databas http://proquest.umi.com/pqdw.*

Press Releases from Lending Tree's web site www.lendingtree.com on Jun. 23 and Sep. 1, 1998 extracted from Interne on Oct. 01, 2002, copy of the current Home page, copy of the Home Page as Nov. Dec. 12, 1998 (marked).*

Clayton,Michelle, "Examining electronic mortgage netwroks" America Community Banker, Washington, Jul. 1988 [online], [retrieved on Apr. 30, 2001] using internet URL: http//proquest.umi.com/pqweb.*

Stillwater, "QuickenMortgage Passes 10,000 Online Submissions" Newsbytes New Network, 3 pages, Mar. 1998 [online] [retrieved on Apr. 30, 2001] using internet URL http://proquest.umi.com.*

Wise, Christy, "Three strategies" Mortgage Banking; Washington; Apr. 1998 [online], 9 pages [retrieved on Apr. 30, 2001], using the Internet URL: http://proquest.umi.com.*

Sindell, Kathleen, "Online lending–not business as usual" Mortgage Banking, Washington; Aug. 1998 10 pages, [on-l;ine], [retrieved on Apr. 30, 2001], using the Internet URL: http://proquest.umi.com.*

Bank, david, "Microsoft to open On–Line Realty, Service Today" The Wall Street Journal; New York; 3 pages, Jul. 1998 [online], [retrieved on Apr. 30, 2001], using Internet URL: http://proquest.umi.com.*

Anonymous, "Canadian mortgagaes go online:Bank of Montreal offers quick laon approval over the Internet", Bank Advertising News; North Palm Beach; Mar. 10, 1997 [online], http://proquest.umi.com.*

Fact Sheet (LionInc.com.Network, a web site of Lion inc., Denver, Colorado, [online], [retrieved on May 01, 2001], Retrieved on the Internet: http://lioninc.com.*

Company news "Countrywide Home Loans Now Offers Online Center for First–time Home Buyers" on May 15, 1998 [online], [retrieved on Apr. 30, 2001], on the internet URL: http://www.countrywide.com.*

Butler, Jeff, "Partnership Bridged with Technology," Mortgage Banking, v53n11, pp. 12–19 Aug., 1993.

Marjanovic, Steven, "Intuit Investing $6M in Loan Processing Service for Web," American Banker, v163n116, p. 13(1), Jun. 19, 1998.

Luhby, Tami, "Loan Processing System Offers Internet Data Access," American Banker, v163, p. 12, Jun. 30, 1998.

* cited by examiner

Update.LendDail.fp3 N. and S. Regions when pricing is the same

| Update.LendDail.fp3 Pages 1-2 N. and S. Regions | Update.LendDail.fp3 Pages 1-2 CA Region | Update.LendDail.fp3 Page 3 All Regions | Return to Main Menu |

Update.LendDail.fp3 NE. and SE. when pricing is different

Update.LendDail.fp3 Pages 1-2 N. E. Regions    Update.LendDail.fp3 Pages 1-2 S. E. Regions Update daily rates and points via Internet.

Update.LendTC.FP3 when adjustments or notes have been changed

Update.LendTC.FP3 Pages 1-2 All Regions    Update.LendTC.FP3 Page 3 All Regions

Update Adjustments, terms and conditions via the Internet.

Figure 2b

Product List View - Extended

| | | Series ID | Lender | | Product | Interest Rate | 15 | 30 | 45 | 50 | 60 | 90 |
|---|---|---|---|---|---|---|---|---|---|---|---|---|
| select | 9:02:19 AM | CCB030-15-C | 222222 | 3/5/99 | 030-1-15 | 6.75 | | | 1.875 | 1.875 | | |
| select | 9:02:19 AM | CCB030-30-C | 222222 | 3/5/99 | 030-1-30 | 7.125 | | | 1.875 | 1.875 | | |
| select | 9:02:19 AM | CCB030-15-C | 222222 | 3/5/99 | 030-2-15 | 6.875 | | | 1.375 | 1.375 | | |
| select | 9:02:19 AM | CCB030-30-C | 222222 | 3/5/99 | 030-2-30 | 7.25 | | | 1.500 | 1.500 | | |
| select | 9:02:19 AM | CCB030-15-C | 222222 | 3/5/99 | 030-3-15 | 7 | | | 1.000 | 1.000 | | |
| select | 9:02:19 AM | CCB030-30-C | 222222 | 3/5/99 | 030-3-30 | 7.375 | | | 1.125 | 1.125 | | |
| select | 9:02:19 AM | CCB030-15-C | 222222 | 3/5/99 | 030-4-15 | 7.125 | | | 0.625 | 0.625 | | |
| select | 9:02:19 AM | CCB030-30-C | 222222 | 3/5/99 | 030-4-30 | 7.5 | | | 0.750 | 0.750 | | |
| select | 9:02:19 AM | CCB030-15-C | 222222 | 3/5/99 | 030-5-15 | 7.25 | | | 0.250 | 0.250 | | |
| select | 9:02:19 AM | CCB030-30-C | 222222 | 3/5/99 | 030-5-30 | 7.625 | | | 0.375 | 0.375 | | |
| select | 9:02:19 AM | CCB030-15-C | 222222 | 3/5/99 | 030-6-15 | 7.375 | | | 0.000 | 0.000 | | |
| select | 9:02:19 AM | CCB030-30-C | 222222 | 3/5/99 | 030-6-30 | 7.75 | | | 0.000 | 0.000 | | |
| select | 9:02:19 AM | CCB030-15-C | 222222 | 3/5/99 | 030-7-15 | 7.5 | | | -0.375 | -0.375 | | |
| select | 9:02:19 AM | CCB030-30-C | 222222 | 3/5/99 | 030-7-30 | 7.875 | | | -0.250 | -0.250 | | |
| select | 9:02:19 AM | CCB030-15-C | 222222 | 3/5/99 | 030-8-15 | 7.625 | | | -0.625 | -0.625 | | |
| select | 9:02:19 AM | CCB030-30-C | 222222 | 3/5/99 | 030-8-30 | 8 | | | -0.625 | -0.625 | | |
| select | 9:02:19 AM | CCB030602-C | 222222 | 3/5/99 | 030/602-1 | 10.125 | | | 1.875 | 1.875 | | |
| select | 9:02:19 AM | CCB030602-J | 222222 | 3/5/99 | 030/602-10 | 11.25 | | | -1.125 | -1.125 | | |
| select | 9:02:19 AM | CCB030602-C | 222222 | 3/5/99 | 030/602-11 | 11.375 | | | -1.375 | -1.375 | | |
| select | 9:02:19 AM | CCB030602-C | 222222 | 3/5/99 | 030/602-12 | 11.5 | | | -1.625 | -1.625 | | |
| select | 9:02:19 AM | CCB030602-C | 222222 | 3/5/99 | 030/602-13 | 11.625 | | | -1.875 | -1.875 | | |

Click on the product you wish to view...

( Find Loan Product )

Figure 2c

Lend TC.FP3

| | | |
|---|---|---|
| Effective Date: | 3/27/99 | Effective Time: 9:44:35 AM |

Lender: Chevy Chase Bank    Lender Abreviated Name: CCB

Lender ID: 156257

Series ID: CCB473-C

Product Number: 473-1

Loan Descriptoin: 1yr Arm

Interest Rate: 4

Margin: 3.000

Index Current: 4.490

Index Definition: 1 Yr Treasury Notes

Broker or Correspondent: ☒ Broker  ☒ Correspondent

MI OPTION: ☐ Lender Paid

Loan Type: ⦿ Conventional  ○ FHA  ○ VA  ○ CHB

Property Type: ☒ Primary Residence  ☒ Second Home  ☐ Commercial  ☐ Investment  ☐ Condo 1-4 Units  ☒ Condo High Rise  ☐ Condo Mixed Use  ☐ Farm  ☐ Trailer  ☒ Other Purchace/Refinance: ☒ Purchase  ☒ Refi Cash Out  ☒ Refinance  ☐ Construction Conforming/Jumbo: ☒ Conforming  ☐ Jumbo Documentation: ☒ Full Doc  ☐ Low Doc  ☐ No Doc  ☒ NIV Paper: ☒ A  ☐ B  ☐ AA  ☐ C  ☐ A-  ☐ D

[Buttons: Add New Product | Duplicate | Delete Product | Print Product | List Extended | Find Product | Lender Info | Main Menu | Terms & Cond]

Figure 2d (1)
(Continued on next page)

Loan Lock Info

Float Lock:
Ten Day Lock:
Fifteen Day Lock:
Thirty Day Lock:
Forty five Day Lock:
Fifty Day Lock:
Sixty Day Lock: 1.250
Ninety Day Lock:
120 Day Lock:

Rate Cap Info

Life Cap Up: 11.250

States Where Product May be Used

| | | | | | | | |
|---|---|---|---|---|---|---|---|
| ☐AL | ☒CT | ☐ID | ☐LA | ☐MS | ☒NJ | ☐OK | ☐TN | ☐WV |
| ☐AK | ☒DE | ☒IL | ☐ME | ☒MO | ☐NM | ☐OR | ☐TX | ☒WI |
| ☐AZ | ☒DC | ☒IN | ☒MD | ☐MT | ☒NY | ☒PA | ☐UT | ☐WY |
| ☐AR | ☐FL | ☐IA | ☒MA | ☐NE | ☒NC | ☒RI | ☐VT | |
| ☐CA | ☒GA | ☒KS | ☒MI | ☐NV | ☒ND | ☒SC | ☒VA | |
| ☐CO | ☐HI | ☐KY | ☒MN | ☐NH | ☒OH | ☐SD | ☐WA | |

Figure 2d (2)
(Continued from previous page)

Find Loan Product

Product Number 030-1-15

| | | | |
|---|---|---|---|
| Purchase/Refinance: | Purchase | Type (Gov. or Conv.): | Conventional |
| Loan Description | 15 Yr fixed "Inv-Prod" | Documentation: | NIV |
| Property Use: | Primary Residence | Broker or Correspondent | Broker |
| Mortgage Insurance | | Conforming Jumbo | Jumbo |

( Find )

( Cancel )

Figure 2e

Import from Lotus Export.txt and open Whsalers.
Show
    Blank (Old Records Deleted)
    New Records
    List View (Relookup)
    Update Buttons

Import From Lotus

| Product Number | Interest Rate | Margin | Index Current | Lock 15 | Lock 30 | Lock 45 | Lock 50 | Lock 60 | Life Cap | LockFloat |
|---|---|---|---|---|---|---|---|---|---|---|
| 030-1-15 | 6.750 | | | | | 1.875 | 1.875 | | | |
| 030-1-30 | 8.888 | | | | | 1.875 | 1.875 | | | |
| 030-2-15 | 6.875 | | | | | 1.375 | 1.375 | | | |
| 030-2-30 | 7.250 | | | | | 1.500 | 1.500 | | | |
| 030-3-15 | 7.000 | | | | | 1.000 | 1.000 | | | |
| 030-3-30 | 7.375 | | | | | 1.125 | 1.125 | | | |
| 030-4-15 | 7.125 | | | | | 0.625 | 0.625 | | | |
| 030-4-30 | 7.500 | | | | | 0.750 | 0.750 | | | |
| 030-5-15 | 7.250 | | | | | 0.250 | 0.250 | | | |
| 030-5-30 | 7.625 | | | | | 0.375 | 0.375 | | | |
| 030-6-15 | 7.375 | | | | | 0.000 | 0.000 | | | |
| 030-6-30 | 7.750 | | | | | 0.000 | 0.000 | | | |
| 030-7-15 | 7.500 | | | | | -0.375 | -0.375 | | | |
| 030-7-30 | 7.875 | | | | | -0.250 | -0.250 | | | |
| 030-8-15 | 7.625 | | | | | -0.625 | -0.625 | | | |
| 030-8-30 | 8.000 | | | | | -0.625 | -0.625 | | | |
| 030/602-1 | 10.125 | | | | | 1.875 | 1.875 | | | |
| 030/602-10 | 11.250 | | | | | -1.125 | -1.125 | | | |
| 030/602-11 | 11.375 | | | | | -1.375 | -1.375 | | | |
| 030/602-12 | 11.500 | | | | | -1.625 | -1.625 | | | |
| 030/602-13 | 11.625 | | | | | -1.875 | -1.875 | | | |

Figure 2f

Lend TC.FP3

You may use the Window key above in any screen to open LendTC.FP3, LendDail.fp3, or LendBankFP3

| | |
|---:|:---|
| Lender: | Chevy Chase Bank |
| Lender ID | 156257 |
| Series ID: | CCB473-C |
| Loan Term Years: | 30 |
| Index Definition: | 1 Yr Treasury |
| Convertable: | Yes |
| Min Loan Amount: | $0 |
| Max Loan Amount: | $240,000 |
| Max LTV% | 95 |
| Max CLTV% | 90 |
| Processing Fee: | |
| Underwriting Fee: | |
| Doc Prep Fee: | |
| Table Funding: | |
| Correspondent Funding: | |
| CreditScore: | |

| | |
|---:|:---|
| Max Cash Out: | 50,000 |
| Max LTV for Cash Out: | 80 |
| Prepayment Penalty: | Yes |

- Lender Info
- Print Product
- Find Product
- Lender Info
- Duplicate Record
- Show List
- Main Menu

Special Notes

All correspondents will receive 15 additional days to all lock periods.
All locks must be received by 8:30 am next business day unless otherwise noted.
NINE-MONTH-RATE LOCK PROGRAM -Call for details

Prepayment Penalty Text

MONTHS 1 - 18; 2%, MONTHS 19 - 24: 1.5%, MONTHS 25 - 30: 1%

Rate Cap Info

| | |
|---:|:---|
| Life Cap Down: | |
| Cap Update Change: | 2,000 |

Figure 3a

Lend TC.FP3

You may use the Window key above in any screen to open LendTC.FP3, LendDail.fp3, or LendBankFP3

Cap Down/Rate Change:

Rate Adjustments
Criteria

| Criteria | Adjustment |
|---|---|
| LTV above 90% | 0.125 |
| Second Home | 0.500 |

Points Adjustments
Criteria

| Criteria | Adjustments |
|---|---|
| Waiver of Escrow: Available only for LTV 80% and less | 0.250 |
| Cash out Refi and LTV above 75% | 0.750 |

Figure 3b

Lend TC.FP3

You may use the Window key above in any screen to open LendTC.FP3, LendDail.fp3, or LendBankFP3

| | |
|---|---|
| 120 Day Lock Purchase Only | 1.000 |
| Snap Documentation | 0.500 |
| New York Property Broker Only | 0.250 |
| Cash out refi below 75% LTV | 0.250 |

Margin Adjustments

| Criteria | Adjustment |
|---|---|
| | |

Figure 3c

Lend TC.FP3

You may use the Window key above in any screen to open LendTC.FP3, LendDail.fp3, or LendBankFP3

Cap Adjustments
Criteria                                                                 Adjustment

Figure 3d

Lend TC.FP3

You may use the Window key above in any screen to open LendTC.FP3, LendDail.fp3, or LendBankFP3

Life Cap Adjustments
Criteria                                          Adjustment

Other Applicable Terms

Maximum Loan Amounts Qualification Ratios

| LTV | LOAN AMOUNT | RATIOS |
|---|---|---|
| Owner Occupied | | |
| SFD, TH & Condo | | |
| 90.01-95% | $240,000 | 28/36 |
| 2 Units | | |
| 80-90% | $307,100 | 28/36 |
| 3 Units | | |
| 80% and below | $371,200 | 33/38 |
| 4 Units | | |
| 80% and below | $461,350 | 33/38 |
| Second Homes | $240,000 | 33/38 |
| SFD 80.01 - 90% | $240,000 | 33/38 |
| SFD 70.01 - 80% | $240,000 | 33/38 |
| 1 Unit 70% + below | | |

Minimum Loan Amount: None

Figure 3e

Lend TC.FP3

You may use the Window key above in any screen to open LendTC.FP3, LendDail.fp3, or LendBankFP3

Qualifying Rates 70.01-95% LTV: note rate + 2%
<70% LTV: note rate

Loan Terms 30 years only

Mortgage Insurance

| Owner Occupied | Second Homes |
|---|---|
| 90-95% LTV: 30% | Purchase: LTV>80% - 35% MI |
| 85-90% LTV: 25% | |
| 80-85% LTV: 12% | Rate/Term Refi: LTV>70% - 12% MI |

Sellers Contribution

Owner Occupied
90.01 - 95% LTV 3% Maximum resale, 5% for new construction.

Second Home 3% Maximum
90% LTV or below 6% Maximum
Seller paid prepaids acceptable.

Conversion Option

Temporary Buydown

Not Allowed

Figure 3f

Lend TC.FP3

You may use the Window key above in any screen to open LendTC.FP3, LendDail.fp3, or LendBankFP3

Refinance With Cash Out

| Owner Occupied<br>1-4 Units<br>Max CLTV<br>80% to conforming<br>loan limit<br><br>No maximum cash back. | Second Home SFD<br>SFD Only<br><br>65% to conforming loan limit<br>Minimum credit Scredit<br>of 660 required)<br><br>No maximum cash back. | Investment<br>Not allowed |

Refinance With No Cash Out

| Owner Occupied<br>1unit, TH, condo<br>95% to conforming loan limit<br><br>1-2 Units, TH, Condo<br>90% to conforming loan limit<br><br>3-4 Units<br>80% to conforming loan limit | Second Home SFD<br>80% to conforming loan limit<br>LTV> 75% - 12% MI<br>Minimum Credit Score of 660 |

Notes and Comments

All Lock-ins must be received by 8:30 AM (Eastern Time)
Predatement Penalty

Figure 3g

Lend TC.FP3

You may use the Window key above in any screen to open LendTC.FP3, LendDail.fp3, or LendBankFP3

MONTHS 1-18 . 2%, MONTHS 19-24. 1.3%, MONTHS 25-30 1%
Correspondent Pricing add 15 days to lock period.
Note: Loans must be closed by and in name of CCB unless Lender is a Federally Chartered insured financial institution.
Secondary Financing First Mortgage LTV cannot exceed 80%. or 75% for second homes. Maximum loan amount for the first mortgage is $650,000.

| Purchase | Cash Out REFI | No Cash out REFI |
|---|---|---|
| Owner Occupied | Owner Occupied | Owner Occupied |
| SFD, TH, Condo | SFD, TH, Condo | SFD, TH, Condo |
| Max CLTV 90% | Max CLTV 75% | Max CLTV 90% |
| (80/10/10) | | (80/10/10) |
| | | |
| 2-4 Units not allowed | 2-4 Units not allowed | 2-4 Units not allowed |
| | | |
| Second Home SFD | Second Home/Not allowed | Second Home SFD |
| Max CLTV 89% | | Max CLTV 80% |

Figure 3h

Lender Information

LenderID
222222

| | |
|---|---|
| Lender Name: | Chevy Chase Bank |
| Address1: | 7700 Old Georgetown Road |
| Address2: | |
| City, ST, Zip: | Bethesda  MD  20814 |
| Email | aseller@erols.com |

Short Name: CCB
Phone: 301 907-5441
Fax: 301 907-5209
Website:

Create New Record
Delete Record
Return

LENDER CONTACTS

| Name | Job Title | Phone | Fax |
|---|---|---|---|
| | Closing Dept, Bethesda | 301 907-5300 | 301 907-5672 |
| | Lock-in | 301 907-5581 | 301 907-5678 |
| | Underwriting, Bethesda, MD | 301 907-5441 | 301 907-5209 |
| | Closing Dept, Richmond, VA | 800-276-7285 X 2321 | 804 323-3837 |
| | Underwriting, Richmond, VA | 800-276-7285 X 2311 | 804 323-3837 |
| | | | |

LENDER INFORMATION

Figure 3i

LoanRates Online is an innovative mortgage rate service for brokers, correspondents, and lenders that combines the power of the Internet with a user-friendly loan database

LENDERS:

- Gain Nationwide Exposure and Increase Loan Productivity

- Post Rates and Product Information Quickly and Easily

- Communicate Effectively with Brokers

- Eliminate Faxing Rate Sheets

BROKERS:

- Have Current Rate and Product Information at your Fingertips

- Find the Right Loan for your Client in Seconds

- Close More Loans with Less Effort

- Work at Home or on the Road

For further information contact us at:

Voice: (κφο) φλκ - φοιο
Fax: (λσκ) λσκ - κφλκ
email: κφλκ@κφλκφκοπ

LoanRates Online, Inc. Copyright 1998

Figure 4a

NOTE: You must be a licensed broker or correspondent to access this site.

Continue

This site is best viewed with Netscape Communicator.
Please tell your other lenders about this service.

For further information contact us at:

Voice: (κφο) φλκ - φοιο
Fax: (λσκ) λσκ - κφλκ
email: κφλκ@κφλκφκοπ

LoanRates Online Inc. Copyright 1998

Figure 4b

Find a Loan Product

Specify any one or any combination.

Lender Name: [Chevy Chase Bank ▸]   Type (Gov. or Conv): [All ▸]

Purchase/Refinance: [All ▸]   Documentation: [All ▸]

Loan Description: [7/1 Arm ▸]   Interest Rate: [▸]
                                 Format as 5, or <8

Property Type: [All ▸]   Broker or Correspondent: [All ▸]

Status: [All ▸]   Conforming/Non-Conforming: [Conforming ▸]

Type Paper: [All ▸]

---

Correspondents: you will receive 15 additional days to all lock periods.

Click [Find] to view search results.

Figure 4c

Search Results

Displaying records 1 through 22 of 22 found. New Find

To choose a product, click the "Product" number.

| Lender | Update | Time | Product | Description | CLTV | LTV | Rate | 15 | 30 | 45 | 50 | 60 | 90 | 120 | Float Yrs | Margin | Loan Type |
|---|---|---|---|---|---|---|---|---|---|---|---|---|---|---|---|---|---|
| CCB | 1/29/99 | 10:43:19 AM | 485-1 | 7/1 Arm | 90 | 95 | 5.625 | | | | 3.000 | | | | 30 | 3.000 | Conventional |
| CCB | 1/29/99 | 10:43:19 AM | 485-2 | 7/1 Arm | 90 | 95 | 5.750 | | | | 2.500 | | | | 30 | 3.000 | Conventional |
| CCB | 1/29/99 | 10:43:19 AM | 485-3 | 7/1 Arm | 90 | 95 | 5.875 | | | | 2.000 | | | | 30 | 3.000 | Conventional |
| CCB | 1/29/99 | 10:43:19 AM | 485-4 | 7/1 Arm | 90 | 95 | 6.000 | | | | 1.500 | | | | 30 | 3.000 | Conventional |
| CCB | 1/29/99 | 10:43:19 AM | 485-5 | 7/1 Arm | 90 | 95 | 6.125 | | | | 1.000 | | | | 30 | 3.000 | Conventional |
| CCB | 1/29/99 | 10:43:19 AM | 485-6 | 7/1 Arm | 90 | 95 | 6.250 | | | | 0.500 | | | | 30 | 3.000 | Conventional |
| CCB | 1/29/99 | 10:43:19 AM | 485-7 | 7/1 Arm | 90 | 95 | 6.375 | | | | 0.000 | | | | 30 | 3.000 | Conventional |
| CCB | 1/29/99 | 10:43:19 AM | 485-8 | 7/1 Arm | 90 | 95 | 6.500 | | | | -0.375 | | | | 30 | 3.000 | Conventional |
| CCB | 1/29/99 | 10:43:19 AM | 485-9 | 7/1 Arm | 90 | 95 | 6.625 | | | | -0.750 | | | | 30 | 3.000 | Conventional |
| CCB | 1/29/99 | 10:43:19 AM | 485-10 | 7/1 Arm | 90 | 95 | 6.750 | | | | -1.125 | | | | 30 | 3.000 | Conventional |
| CCB | 1/29/99 | 10:43:19 AM | 485-11 | 7/1 Arm | 90 | 95 | 6.875 | | | | -1.500 | | | | 30 | 3.000 | Conventional |
| CCB | 1/29/99 | 10:43:19 AM | 485937-1 | 7/1 Arm | | 100 | 5.625 | | | | 3.000 | | | | 30 | 3.000 | Conventional |
| CCB | 1/29/99 | 10:43:19 AM | 485937-2 | 7/1 Arm | | 100 | 5.750 | | | | 2.500 | | | | 30 | 3.000 | Conventional |
| CCB | 1/29/99 | 10:43:19 AM | 485937-3 | 7/1 Arm | | 100 | 5.875 | | | | 2.000 | | | | 30 | 3.000 | Conventional |
| CCB | 1/29/99 | 10:43:19 AM | 485937-4 | 7/1 Arm | | 100 | 6.000 | | | | 1.500 | | | | 30 | 3.000 | Conventional |
| CCB | 1/29/99 | 10:43:19 AM | 485937-5 | 7/1 Arm | | 100 | 6.125 | | | | 1.000 | | | | 30 | 3.000 | Conventional |
| CCB | 1/29/99 | 10:43:19 AM | 485937-6 | 7/1 Arm | | 100 | 6.250 | | | | 0.500 | | | | 30 | 3.000 | Conventional |
| CCB | 1/29/99 | 10:43:19 AM | 485937-7 | 7/1 Arm | | 100 | 6.375 | | | | 0.000 | | | | 30 | 3.000 | Conventional |
| CCB | 1/29/99 | 10:43:19 AM | 485937-8 | 7/1 Arm | | 100 | 6.500 | | | | -0.375 | | | | 30 | 3.000 | Conventional |
| CCB | 1/29/99 | 10:43:19 AM | 485937-9 | 7/1 Arm | | 100 | 6.625 | | | | -0.750 | | | | 30 | 3.000 | Conventional |
| CCB | 1/29/99 | 10:43:19 AM | 485937-10 | 7/1 Arm | | 100 | 6.750 | | | | -1.125 | | | | 30 | 3.000 | Conventional |

Figure 5

Product Number: 485-6 CCB　　　　Description: 7/1 Arm

Please enter all requested data on this page. This automatically fills in the Lock Registration Form.

Points Adjustments

Click "Y" to apply the lock period and all adjustments that apply to your client.

| | | | | |
|---|---|---|---|---|
| Float Lock: | ○ Y ⦿ N | 50 Day Lock: | ○ Y ⦿ N | |
| 10 Day Lock: | ○ Y ⦿ N | 60 Day Lock: 0.500 | ⦿ Y ○ N | 0.500 |
| 15 Day Lock: | ○ Y ⦿ N | 90 Day Lock: | ○ Y ⦿ N | |
| 30 Day Lock: | ○ Y ⦿ N | 120 Day Lock: | ○ Y ⦿ N | |
| 45 Day Lock: | ○ Y ⦿ N | | | |

To scroll horizontally in a criteria field, click in it and use the arrow keys.

| Apply | Criteria | Adjustment | |
|---|---|---|---|
| ⦿ Y ○ N | Waiver of Escrow: Available only for LTV 80% and less | 0.250 | 0.250 |
| ○ Y ⦿ N | Cash out Refi and LTV above 75% | 0.750 | |
| ○ Y ⦿ N | 90 Day Lock Purchase Only | 0.500 | |
| ○ Y ⦿ N | 120 Day Lock Purchase Only | 1.000 | |
| ○ Y ⦿ N | Snap Documentation | 0.500 | |
| ○ Y ⦿ N | New York Property Broker Only | 0.250 | |
| ⦿ Y ○ N | Cash out refi below 75% LTV | 0.250 | 0.250 |
| ○ Y ⦿ N | | | |
| ○ Y ⦿ N | | | |
| ○ Y ⦿ N | | | |
| ○ Y ⦿ N | | | |
| ○ Y ⦿ N | | | |
| ○ Y ⦿ N | | | |
| ○ Y ⦿ N | | | |
| ○ Y ⦿ N | | | |
| ○ Y ⦿ N | | | |
| ○ Y ⦿ N | | | |

Figure 6a

You may manually enter other adjustments to points. Explanation below and amount to the right.

Rate Adjustments

Total Points: 1.000

Base Interest Rate

To scroll horizontally in a criteria field, click in it and use the arrow keys. 6.250

| Apply | Criteria | Adjustment | |
|---|---|---|---|
| ◯Y ⦿N | LTV above 90% | 0.125 | |
| ◯Y ⦿N | Second Home | 0.500 | |
| ◯Y ⦿N | 80.01–85% with no MI required—CCB Lender Paid MI | 0.200 | |
| ◯Y ⦿N | 85.01–90% with no MI required—CCB Lender Paid MI | 0.300 | |
| ◯Y ⦿N | 90.01–95% with no MI required—CCB Lender Paid MI Not | 0.675 | |
| ◯Y ⦿N | Credit score from 620–659 | 0.100 | |
| ⦿Y ◯N | Temporary Buy Down | 0.100 | 0.100 |
| ◯Y ⦿N | | | |

You may manually enter other adjustments to the rate. Explanation below and amount to the right.

Total Int Rate: 6.350

Margin Adjustments

To scroll horizontally in a criteria field, click in it and use the arrow keys.

| Apply | Criteria | Adjustment | |
|---|---|---|---|
| ◯Y ⦿N | Credit score from 620–659 | 0.100 | |
| ⦿Y ◯N | Temporary Buy Down | 0.100 | 0.100 |
| ◯Y ⦿N | 85% LTV | 0.200 | |
| ◯Y ⦿N | 90% LTV | 0.300 | |
| ◯Y ⦿N | 95% LTV | 0.550 | |

Total Margin: 0.100

Cap Adjustments

Figure 6b

| Apply | Criteria | Adjustment | |
|---|---|---|---|
| ○ Y ◉ N | First CAP is 3.0, Subsequent CAPS are 2.0 | 0.000 | |
| ○ Y ◉ N | | | |
| ○ Y ◉ N | | | |
| ○ Y ◉ N | | | |
| ○ Y ◉ N | | | |
| | | Total Cap: | 0.000 |

Life Cap Adjustments

| Apply | Criteria | Adjustment | |
|---|---|---|---|
| ○ Y ◉ N | | | |
| ○ Y ◉ N | | | |
| ○ Y ◉ N | | | |
| ○ Y ◉ N | | | |
| ○ Y ◉ N | | | |
| | | Total Life Cap: | 0.000 |

Maximum Loan Amounts Qualification Ratios

| LTV | LOAN AMOUNTS | RATIOS |
|---|---|---|
| Owner Occupied | | |
| SFD, TH & Condo | | |
| 95.01–95% | $240,000 | 28/36 |
| 2 Units | | |
| 80.01–90% | $307,100 | 28/36 |
| 3 Units | | |
| 80% and below | $371,200 | 28/36 |
| 4 Units | | |
| 80% and below | $461,350 | 33/38 |
| Second Homes | | |
| SFD 80.01–90% | $240,000 | 33/38 |
| SFD 70.01–80% | $240,000 | 33/38 |
| 1 Unit 70% + below | $240,000 | 33/38 |
| Minimum Loan Amount: None | | |

Figure 6c

Notes and Comments

All locks must be received by 8:30 am (Eastern Time)
Correspondent Pricing add 15 days to lock period;

Margins for CCB Lender Paid MI Program:
85% LTV 3.200
90% LTV 3.300
95% LTV 3.550
Note: No additional pricing adjustments required for 90.1 - 95% LTVs Secondary Financing First Mortgage LTV cannot exceed 80% (75% for second homes. Maximum loan amount for the first mortgage is $650.000, ($500,000 for second home

| Purchase | Cash Out REFI | No Cash |
|---|---|---|
| Owner Occupied | Owner Occupied | Owner Oc |
| SFD, TH, Condo | SFD, TH, Condo | SFD, TH, |
| Max CLTV 90% (80/10/10) | Max CLTV 75% | Max CLTV |
| 2-4 Units Not Allowed | 2-4 Units not allowed | 2-4 Unit Not allo |
| Second Home SFD Max CLTV 80% | Second Home Not allowed | Second H Max CLTV |

Click [Next] to input broker and customer data.

Figure 6d

Please enter all requested data in fields marked *; other fields are optional.

Lock Registration Data Input Form

| | BORROWER | | CO-BORROWER | |
|---|---|---|---|---|
| * | Joseph | FIRST NAME | Joann | |
| | J. | MIDDLE NAME | J. | |
| * | Jones | LAST NAME | Jones | |
| | | NAME SUFFIX | | |
| | 111-22-3333 | SOCIAL SECURITY NUMBER | 111-22-4444 | |
| | 4500 | MONTHLY INCOME | 4500 | |
| | 44 | AGE | 42 | |

| | BORROWER's ADDRESS | | PROPERTY TO BE MORTGAGED | |
|---|---|---|---|---|
| | 123 Main Street | STREET | * | 123 Main Street |
| | McLean | CITY | * | McLean |
| | Virginia | STATE | * | Virginia |
| | Fairfax | COUNTY | | Fairfax |
| | 22101 | ZIP | * | 22101 |
| | | LOT NUMBER | | 44 |
| | Copy to Mortgage Address | LOAN AMOUNT | * | 200,000 |
| | | PROPERTY VALUE | * | 300,000 |
| | | LOAN TO VALUE | | 67% |
| | | PURCHASE PRICE | | |

Figure 7a

BROKER NAME | BRANCH LOCATION | ACCOUNT REP

* New Age Mortgage Company | * Mclean | Sue Smith

LOAN OFFICER | BROKER PHONE | BROKER FAX#

* Bob Brown | * 703 111-2222 | * 703 111-3333

PRIMARY CONTACT | LOCK DATE | APPLICATION D

John Johnson | Jan 28, 1999 | Jan 28, 1999

ESTIMATED CLOSING DATE

Feb 26, 1999

*Purchase/Refinance: ○ Purchase ● Rate Refi ○ Cash Out Refi ○ Construction

*Lock Term: ○ FLOAT ● LOCK ○ RE-LOCK

*Occupancy: ● Owner Occupied ○ Non-owner Occupied

*Property Type: ● SFD ○ PUD ○ Condo ○ Townhouse ○ 2-4 Unit ○ Modular
  ○ Farm ○ Trailer ○ Other Click [Next] for automated Lock Registration Form

Figure 7b

Automated Lock Registration Form

| BROKER NAME | BRANCH LOCATION | ACCOUNT REP NAME | LOAN OFFICER |
|---|---|---|---|
| New Age Mortgage Company | McLean | Sue Smith | Bob Brown |
| BROKER PHONE | BROKER FAX # | PRIMARY CONTACT | LOCK DATE |
| 703 111 2222 | 703 111 3333 | John Johnson | Jan 28, 1999 |

| APPLICATION DATE | ESTIMATED CLOSING DATE | | | |
|---|---|---|---|---|
| Jan 28, 1999 | Feb 26, 1999 | | | |
| BORROWER'S LAST NAME | FIRST | MIDDLE | SOCIAL SECURITY No. | AGE |
| Jones | Joseph | J. | 111-22-3333 | 44 |
| CO-BORROWER'S NAME | FIRST | MIDDLE | SOCIAL SECURITY No | AGE |
| Jones | Joann | J. | 111-22-4444 | 42 |

PROPERTY TO BE MORTGAGED — COUNTY: Fairfax
- Address: 123 Main Street
- City, ST, Zip: McLean, Virginia, 22101

| LOAN DESCRIPTION | EFFECTIVE DATE/TIME | PURCHASE TYPE |
|---|---|---|
| 7/1 Arm | 1/29/99 | Rate Refi |
| PRODUCT NUMBER | CONVERSION AVAILABLE | LOCK TERM |
| 485-6 CCB | No | LOCK |

| LOAN AMOUNT | CAPS (ARMS) | LIFE CAP | LOCK TERM |
|---|---|---|---|
| 200,000 | 3.00 | 12.25 | FLOAT: ☐ |
| PURCH PRICE | MRKT VALUE | MARGIN (ARMS) | 10 DAY: ☐   50 DAY: ☐ |
|  | 300,000 | 3.00 | 15 DAY: ☐   60 DAY: 0.500 |
| PROPERTY TYPE | LOAN TO VALUE | OCCUPANCY | 30 DAY: ☐   90 DAY: ☐ |
| SFD | 66.7% | Owner Occupied | 45 DAY: ☐   120 DAY: ☐ |

- Borrower: Joseph Jones
- Broker: New Age Mortgage Company

Figure 8a

To scroll horizontally in a criteria field, click in it and use the arrow keys.

| Adjustments to Interest Rate | | Base Rate: 6.250 Adjustments to Points | |
|---|---|---|---|
| LTV above 90% | 0.000 | Waiver of Escrow: Available only for LTV 80% and less | 0.250 |
| Second Home | 0.000 | Cash out Refi and LTV above 75% | 0.000 |
| 80.01–85% with no MI required—CCB Lender Paid MI | 0.000 | 90 Day Lock Purchase Only | 0.000 |
| 85.01–90% with no MI required—CCB Lender Paid MI | 0.000 | 120 Day Lock Purchase Only | 0.000 |
| 90.01–95% with no MI required—CCB Lender Paid MI Note: Do not use LTV above 90% rate add-on above | 0.000 | Snap Documentation | 0.000 |
| Credit score from 620–659 | 0.000 | New York Property Broker Only | 0.000 |
| Temporary Buy Down | 0.100 | Cash out refi below 75% LTV | 0.250 |
| | 0.000 | | 0.000 |
| | | | 0.000 |
| | | | 0.000 |
| | | | 0.000 |
| | | | 0.000 |
| | | | 0.000 |
| | | | 0.000 |
| | | | 0.000 |
| | | | 0.000 |
| | | | 0.000 |
| Other adjustments | | Other adjustments | |
| Total Adjusted Interest Rate: | 6.350 | Total Adjusted Points: | 1.000 |

Total Margin With Adjustments: 3.10   Total Cap With Adjustments: 3.00   Total Life Cap With Adjustments: 12.25

Lender ID: 156257   Lender Name: Chevy Chase Bank   Borrower: Joseph Jones   Broker: New Age Mortgage Company

| Contact | Title | Phone | Fax |
|---|---|---|---|
| | Closing Department/Bethesda MD | 301-907-5300 | 301-907-5672 |
| | Lock-ins | 301-907-5581 | 301-907-5678 |
| | Underwriting/Bethesda MD | 301-907-5441 | 301-907-5209 |
| | Closing Department/Richmond VA | 800-276-7285 x 2321 | 804-323-3837 |
| | Underwriting/Richmond VA | 800-276-7285 x 2311 | 804-323-3837 |

Please print and fax to the lender, or if you have fax software, please fax from your computer.

Click the [ Next ] button to show details, terms, and conditions.

Figure 8b

SYSTEM AND METHOD FOR TRANSMITTING AND PROCESSING LOAN DATA

This application claims the benefit of U.S. Provisional Patent Application Ser. No. 60/099,665 filed Sep. 9, 1998, the entire disclosure of which is incorporated herein by reference.

This application includes a microfiche appendix having 1 fiche and 72 frames.

This application relates to Disclosure Document Number 429419, filed Jan. 21, 1998.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

1. Field of the Invention

The present invention relates generally to the field of disseminating loan program information, including rate information, and to automated systems for collecting and disseminating loan information.

2. Related Art

Home mortgages, home equity loans, auto loans, and other lending products may be distributed through a variety of channels, brokers, and correspondents. Particularly in the case of complex mortgage loans, there may be variable "points" and a complex set of additional adjustments to the loan rate based on the presence or absence of a variety of factors. In the past, current rates and points from particular lenders (including required adjustments) have been published to these sales channels via fax. There have also been efforts to automate the calculation of such adjustments by receiving the text of the lender's fax sheet and parsing it analytically to apply necessary adjustments based on applicant information. Such efforts have not, however, been entirely successful in providing a user friendly and accurate interface.

An article by Jeff Butler entitled "Partnership Bridged with Technology", *Mortgage Banking* v53n11, pp. 12–19, August, 1993, generally suggests systems for allowing electronic communications links between a mortgage company and its customers—brokers, correspondent lenders, real estate agents, and consumers. The article specifically discloses Citicorp's MortgagePower Plus system and Countrywide Funding Corp.'s DirectLine Plus system. Mortgage-Power Plus provided software which permitted loan purchasers to select between loan types, enter their data and prequalify themselves, and obtain a loan commitment from the mortgage company. DirectLine Plus includes software which provides brokers with online access to Countrywide's current loan data and the ability to lock-in a particular loan.

An article by Norman Miller entitled "Web Implications and Resources for Real Estate Finance", *Real Estate Finance*, v13n3, pp.74–83, Fall, 1996, discloses various Internet- and intranet-based systems for processing loan applications. Miller further discloses providing electronic forms which "can be programmed to check to see if all the necessary information is included prior to transmission . . . ."

An article by Tami Luhby entitled "Loan Processing System Offers Internet Data Access", *American Banker*, v163, p.12, Jun. 30, 1998, discloses an online database with wholesale lenders' fees, rates, and product information. The publication also discloses online loan application processing. An article by Steven Marjanovic entitled "Intuit Investing $6M in Loan Processing Service for Web", *American Banker*, v163n116, p.13(1), Jun. 19, 1998, discloses an Internet loan processing service website ("quickenmortgage.com") which uses loan information from lenders and allows consumers to enter data, get mortgage rate quotes, and submit loan applications.

Other references generally showing electronic means for processing loan or other applications include U.S. Pat. No. 4,194,242 to Robbins, U.S. Pat. No. 4,876,648 to Lloyd, U.S. Pat. No. 5,239,462 to Jones, et al., U.S. Pat. No. 5,523,942 to Tyler, et al., U.S. Pat. No. 5,611;052 to Dykstra, et al., U.S. Pat. No. 5,673,402 to Orion, et al., U.S. Pat. No. 5,699,527 to Davidson, U.S. Pat. No. 5,6742,775 to King, and U.S. Pat. No. 5,765,144 to Larche, et al.

In view of the above, there is a need for a system and method which provides access to information on a variety of loan programs from different lenders, yet is accurate and results in correct calculations (including adjustments) of loan rates and points by brokers and other correspondents.

OBJECTS AND SUMMARY OF THE INVENTION

In a preferred embodiment, the invention provides a computer system that enables mortgage lenders and commercial banks to transmit their data daily easily and inexpensively via the Internet. The system enables mortgage brokers, correspondents and retail consumers to download or access the data live via the Internet, automatically search, calculate and apply appropriate adjustments to loan rates and points, and electronically register selected products with the selected lenders.

In its preferred embodiment, the invention provides an automated system for collecting and disseminating loan information over a network connection which includes a server which receives loan data, including daily loan data, from lenders and stores the loan data in a database. A web server provides to users (e.g., brokers, correspondents, or retail loan customers) interactive web content including loan information and a list of loan criteria which would affect the quoted points, rate, cap, or margin associated with a particular loan. The web server receives a user's applicable loan criteria selected from the list of possible loan criteria. And uses that applicable loan criteria and the loan data from the lender to create a list of adjustments to the points, rate, cap or margin. A quoted interest rate and the list of points and applicable adjustments are transmitted by the web server to the user.

By using the Internet, the preferred embodiment eliminates the costly and time-consuming tasks of transmitting product data and loan lock registration forms via the fax. It eliminates the need for brokers and correspondents to calculate rate and cost adjustments manually and for lenders to check the calculations manually. By enabling electronic selection and registration of loan products the system of the invention reduces the cost to brokers and correspondents and eliminates the risk that brokers and correspondents currently experience because of the inevitable lag time between the time a broker faxes a loan order and the lender verifies the adjustment calculation and locks the rate.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIGS. 2a–2e show screen displays illustrating the interface for the lender software of the invention.

FIG. 2f shows the interface of software used to import daily data from an ASCII file prepared by the lender's current spreadsheet software.

FIGS. 3a–3h show screen displays illustrating the interface for receiving terms and conditions from a lender to define a loan product.

FIG. 3i shows a screen display for the interface for receiving lender information from a lender.

FIGS. 4a and 4b show a screen display illustrating the initial page of the web interface of the invention.

FIG. 4c shows a screen display illustrating a "Find a Loan Product" page which allows a user to enter search criteria.

FIG. 5 shows a screen display illustrating a "Search Results" page of the web interface of the invention.

FIGS. 6a–6d show a screen display illustrating a "Points Adjustments" page of the web interface of the invention.

FIGS. 7a–7b show a screen display illustrating a "Lock Registration Data Input" page of the web interface of the invention.

FIGS. 8a and 8b show a screen display illustrating an "Automated Lock Registration" page of the web interface of the invention.

DETAILED DESCRIPTION

The inventive system automates the process of updating and transmitting lender loan product information to brokers and correspondents. Each day, lenders automatically transfer information on rates, points, caps, and margins of their products from their lender spreadsheets into lender software residing on their PCs, where other product information that does not change daily (such as adjustments, loan matrix, and lender information) is maintained. The lender software transmits all the information via the Internet to a related Web site. This process is simpler to the user because it requires no manual data input. Brokers and correspondents can access the site live via a browser or proprietary software, with the capability to download the data to a local computer. The broker or correspondent then has the ability to search the product offerings and find a product with a base rate and points of his choosing. When a broker or correspondent selects a product, only the adjustments and matrix information for that particular product appear. Once the broker or correspondent selects applicable adjustments, the system makes all the mathematical computations automatically and displays the total cost. After viewing the total cost, the broker or correspondent may click a button to register the loan product electronically with the lender.

The system according to a preferred embodiment stores descriptions of possible adjustments, receives current numeric values for those adjustments, and presents the possible adjustments applicable to a specific loan product (e.g. for rates, points, margin, cap, or life cap) in a standardized display format. The record for each adjustment includes criteria, amount of adjustment, and an extended amount. The possible adjustments are displayed on a screen for the broker, who may click "apply" for each adjustment if appropriate, or otherwise indicate to the software that particular adjustment criteria are applicable. If an adjustment is selected, the adjustment amount is included in automatic calculations in the form. The system also provides a report to the lender and the broker or correspondent showing the adjustments that were applied by the broker or correspondent, for quality control and audit purposes.

The software according to the preferred embodiment of the invention runs on general-purpose IBM-compatible office PCs and Macintosh computers and does not require any special equipment to access the software other than a computer, a modem or other appropriate Internet connection, and a browser such as the commonly available Netscape or Internet Explorer browsers.

Figure 1:
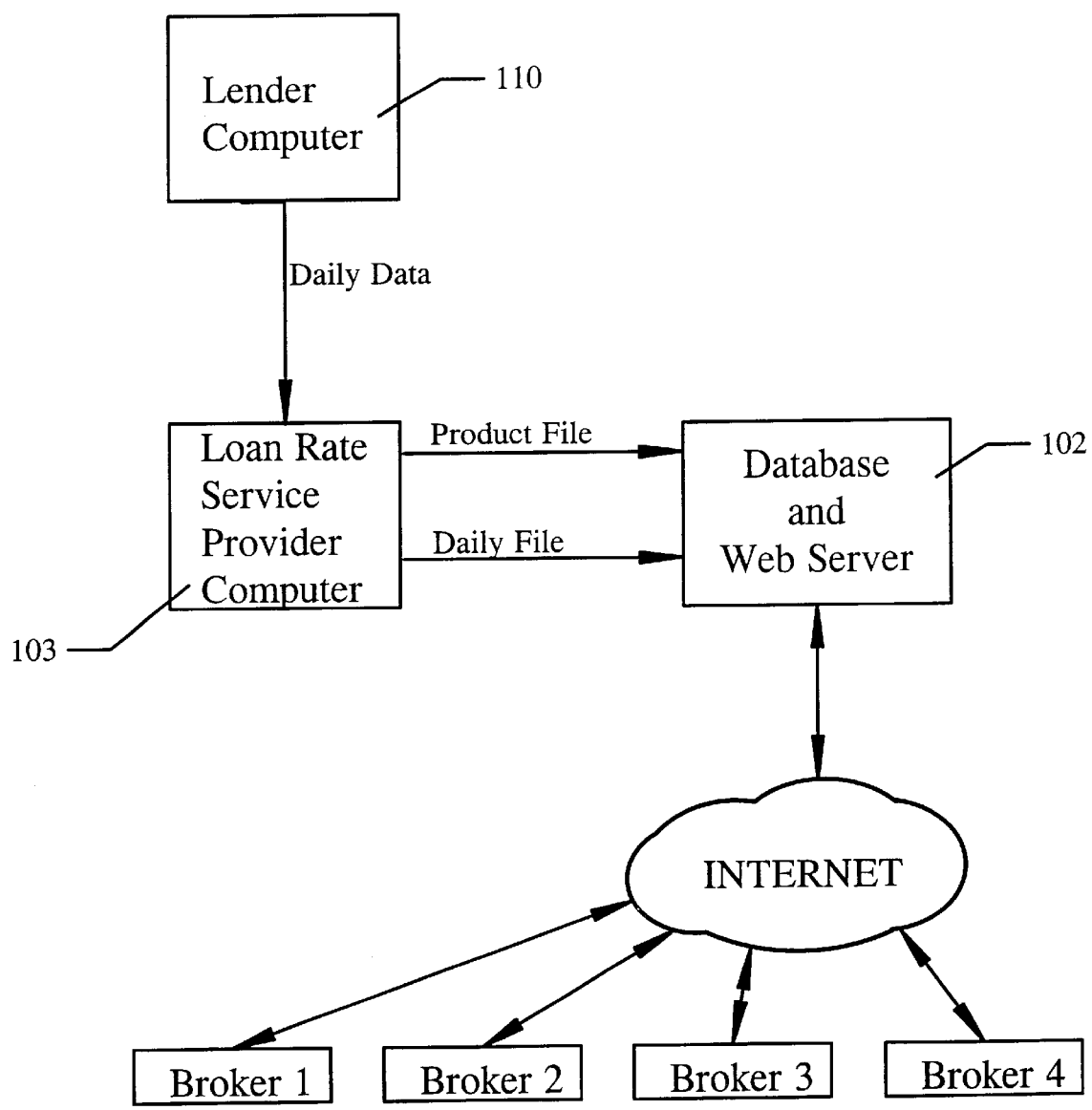
FIG. 1 is a schematic block diagram of a preferred embodiment of the system of the present invention.

Referring to FIG. 1, a database and web server 102 has an Internet connection and holds a database of loan data (e.g., rates, points, caps, margins), middleware for generating web content based upon loan data in the database, and web server software for using that web content to interact with brokers/correspondent computers Broker 1 through Broker 4.

Broker computers Broker 1 through Broker 4 are each associated with a live user, e.g., a broker/correspondent, and run Internet client software, such as a web browser, or proprietary broker software. The broker computers also have an Internet connection through which they access database and web server 102.

A loan rate service provider computer 103 has a data connection to the Internet server 102 and runs lender/bank software which creates and updates lender database files which are stored locally and are then used to update server database files stored on the database and web server 102. The loan rate service provider computer may reside, e.g., at the lender's location or at a remote site, e.g., at a loan rate service provider's site. A lender computer 110 at a lender/bank runs spreadsheet software and may have a data connection to the loan rate service provider 103. These latter two data connections may be public or private computer network connections, such as a secure Internet or private intranet connections. The spreadsheet software is used to make changes to loan data which changes daily to regularly export a file with that data which is then imported by the lender software and used to update the lender and server database files.

In a typical system according to the invention, there may be a large number of broker computers and lender computers, the number being reduced in FIG. 1 for purposes of clarity.

According to a preferred embodiment, the lender database files residing on the loan rate service provider computer 103 and the server database files residing on the web server 102 are created using scripts written for the FileMaker Pro software application manufactured by FileMaker, Inc, a subsidiary of Apple Computer. Source code for the File Maker Pro scripts used in the system are included in the microfiche appendix which is incorporated into the present specification. It should be noted that embodiments of the invention which use other database software, such as that provided by Oracle of Redwood Shores, Calif., is envisioned and is within the spirit and scope of the invention.

The middleware which resides on the database and web server 102, and which creates the interactive web content which is ultimately served to broker computers via the Internet, may comprise suitable software such as, e.g., Lasso Middleware manufactured by Blue World Communications, Inc., of Bellevue, Wash. Suitable web server software includes, e.g., Webstar manufactured by Starnine, Inc., of Berkeley, Calif.

The database and web server 102 (FIG. 1) comprises a server computer such as, e.g., an Apple G3, and is hosted by an Internet service provider or is otherwise provided with a fast Internet connection.

An overview of the data flow will now be given, followed by a detailed description of the processes and functions associated with the various pieces of software of the invention.

First, databases of loan data are created on the loan rate service provider computer. These databases are referred to herein as the "lender databases." The loan data in these databases may include information on each lender using the system, the loan products offered by each lender, and initial information on the rates and points associated with each of those products which may be different for various regions as decided by the lender. The database structure accommodates different rates and points for different regions. The lender software residing on the loan rate service provider computer 103 then uploads data from those databases to the database and web server 102, where the data is used to update similar databases residing thereon. These databases are referred to herein as the "server databases." The server databases are then used by middleware residing on the database and web server 102 to create interactive web content, e.g., HTML files. These files are served, by web server software also residing on the database and web server 102, to Internet clients (e.g., web browser software) running on broker computers Broker 1 through Broker 4. Each day, as rates and points associated with the various loan products change, bank personnel make changes to a spreadsheet running on the lender computer 110; the bank personnel then export an ASCII file of with this "daily data" and transmit the exported file to the loan rate service provider computer 103. The daily dated file is then imported into the lender software and is used by that software to update the lender databases. Updated data from the lender databases is then transmitted to the database and web server 102, where it is used to update the server databases.

By using the invention in the above-described manner, lenders can easily make daily updates to the data (including different data for different regions) which is served out to brokers over the Internet without the need for them to perform HTML authoring on a daily basis.

A detailed description of the software of the invention will now be provided.

As discussed above, two similar sets of database files are preferably used to store loan data. The first set, which resides on the computer 103 and is manipulated by the lender software, is referred to herein as the "lender files." The second set, which resides on the database and web server 102, is referred to herein as the "server files."

The Lender Terms & Conditions file updates the Server Terms & Conditions file. The Lender Bank Information file updates the Server Bank Information file. The Lender Daily file updates the Server Daily file (of rates and points)

Examples of the scripts associated with the lender files and the server files are shown in the microfiche appendix which is attached hereto and is incorporated into the present disclosure. These files will now be discussed.

SERVER FILES

ServTC.FP3—This file stores the terms and conditions associated with all products for all lenders using the system.

ServBank.FP3—This file stores lender bank information such as the bank's name, address and contact information, for all lenders using the system.

ServDail.FP3—This file stores the updated daily information on rates and points for all products residing in Master.ndg.

Input.FP3—This file stores all data input by the broker or correspondent. It gets data from ServDail.FP3, ServBank.FP3, and ServTC.FP3. All calculations such as computing adjustments are done in Input.FP3.

LENDER FILES

LendTC.FP3—This file stores the terms and conditions associated with all products for all lenders using the system.

LendBank.NDG—This file stores lender information such as the lender's name, address and contact information.

LendDail.FP3—This file stores the updated daily information on rates and points for all products residing in LendTC.FP3

Import from Lotus.FP3—This file imports data from an ASCII file prepared by the lender's current spreadsheet such as Lotus or Microsoft EXCEL. It also converts decimal numbers to percent numbers for those data fields that are exported as decimal numbers instead of percent numbers. A button on this file's screen sends a message to LendDail.FP3 to initiate a script to lookup data from Import from Lotus.FP3

Figure 2A:
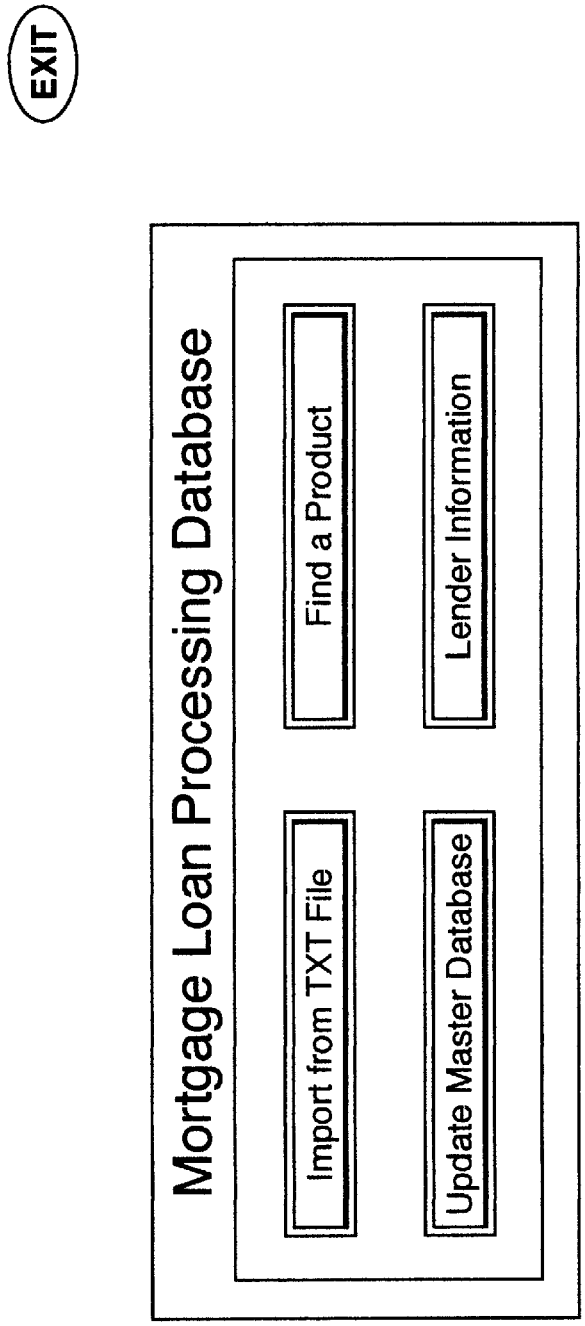

The lender software and update processes and data flow will now be described in more detail. The interface provided by the lender application is shown in FIGS. 2a–2e. In particular, these figures show screen displays for the lender application, including control menus for database importation, updating the database, archiving, and restoring data. These screens correspond to the file "LendDail.FP3" which is described below. FIG. 2f shows the interface of software used to import daily data from an ASCII file prepared by the lender's current spreadsheet software, such as Lotus or Microsoft EXCEL. This screen corresponds to the file "ImportFromLotus.FP3" which is described below.

FIGS. 3a–3h show screen displays for the interface for receiving terms and conditions from a lender. The information indicated in these "Loan Package Detail" screen displays is provided to the system to define the available loan packages in the database. These screens correspond to the file "LendTC.FP3" which is described below. FIG. 3i shows a screen display for the interface for receiving lender information from a lender. This screen corresponds to the file "LendBank.FP3" which is described below.

The lender application is used by lenders to create and update products available from their institution to registered brokers and correspondents. The application allows each lender to perform three different updates of their products to the master files located on the server. The first update is to the "daily" file (LendDail.PF3), which consists of rates, points, caps, margins, and life caps. These items change daily and sometimes more than once a day, and so this update is performed often. The data used to update the daily file is received from a spreadsheet file exported from a spreadsheet application running on the lender computer 110. The second type of update, which is performed less often, is to the "products" file (LendTC.FP3), which contains full matrix information, lenders information, applicable adjustments. These items do not normally change on a daily basis. The third type of update is LendBank.FP3 to ServBank.FP3 to update bank information such as name, address and contact information.

Once the data has been updated in the lender software, the computer on which that software is running is connected to the Internet and, by simply selecting one of six buttons, "Upload Daily File First Set" "Upload Daily File Second Set" or "Upload Products File First Set", "Upload Products File Second Set", "Upload Lender Info File First Set", "Upload Lender Info File Second Set", the information is uploaded to the database and web server 102.

Access to the content on the Internet server by brokers or correspondents is provided by either a standard Internet client (such as a web browser) or proprietary Broker/Correspondent software. Because of the ubiquity of Internet client software, embodiments wherein brokers access the Internet server using a standard Internet client is preferred. The proprietary Broker/Correspondent software and the download process performed using that software will first be described.

PROPRIETARY BROKER/CORRESPONDENT SOFTWARE

In one embodiment, both brokers and correspondents can download product information available from participating lenders as well as process customer loan applications with the software. This process is controlled via script, which resides in the software. These scripts are as follows:

Get Products Update—This script connects to the Internet web server and downloads either a new set of product files or a new set of daily update files.

Update Products—This script accesses the files downloaded in the Get Product Update Process, and imports either a new set of product files or a new set of daily files into the broker/correspondent software.

The software provided to brokers and correspondents includes customer related files, files not related to a specific customer include Lender Information, and Loan Product data.

The components of a related customer file:

Create Customer Record—General information name and address

Quick or Full Application—Property, loan, and customer information

Find a Product Screen—Search criteria for customer

List View—This page consists of just the basic information, effective date, lender short name, max LTV, max CLTV, rates, points, loan description, product number, loan term years, and loan type.

Extended List View—This page gives more information such as margin, cap, life cap, index definition, max and minimum loan amount, conversion option, documentation.

Loan Package Detail—Overall information of selected loan product

Loan package Worksheet—Overall information with the ability to select adjustments to product.

Automated Lock Registration Form—These two pages are automated information from the Loan Package Worksheet and customer information file, along with edited data from the broker or correspondent.

Customer Record—This form keeps a tracking record if more than one loan is registered to the same customer name. In addition it keeps a tracking record of all correspondent information to each loan under that customer name.

Closing Information—This form keeps track of all related closing information, such as closing Attorney, Appraiser, existing loan information to be paid off, new loan information, etc.

Customer Menu—A complete menu of files above for easy selection when viewing a customer file The components of the non-customer related file:

Find a Product Screen—General search

List View—See above

List View Extended—See above

Loan Package Detail—See above

Lender Information includes lender phone numbers, address, contacts, fax numbers, e-mail, and promotional descriptions. Product Data includes all product data, numbers, descriptions, and matrix information.

INTERNET CLIENT EMBODIMENT

As set forth above, an alternative and preferred embodiment uses a standard Internet client in place of the proprietary broker/correspondent software to provide brokers and correspondents with access to the information via a website. In. this embodiment, the system of the invention can be accessed live on the web without downloading any files. The web-based system preferably operates using a G-3 server with the same functionality as described herein but without the tracker file.

The web-based embodiment will now be described in detail with reference to FIGS. 4–8. FIGS. 4–8 show screenshots of the broker/correspondent's interface to the as seen through a standard web browser. FIGS. 4a and 4b show an initial screen. FIG. 4c shows a "Find a Loan Product" screen which allows a broker/user to select criteria needed to find a particular loan product. FIG. 5 shows a "Search Results" screen which displays the results for the criteria entered in the screen shown in FIG. 4c. FIGS. 6a through 6d show an "Adjustments" screen which is used by the broker/user to determine all related cost, rate, cap, life cap, and margin adjustments that are applicable for a particular borrower. FIGS. 7a and 7b show a "Lock Registration Data Input" screen which is used by the broker to input customer and broker data that is required by the lending institution to properly register the loan product selected. FIGS. 8a and 8b show an "Automated Lock Registration" screen which displays all automated loan product, customer, and broker/correspondent information, including adjustment information, for viewing before electronically sending a loan product request to the lender.

The system and methods provided in the invention offer numerous advantages over the prior art. In particular, the system can be used to provide an automated information and transaction-processing service that is offered to mortgage lenders, commercial banks, brokers, and correspondents via subscription. It replaces fax transmittal between Banks, Lenders, Brokers, and Correspondents.

The system of the invention provides many compelling advantages for lenders, including:

1) It enables lenders to make loan product information instantly available to the entire broker community, compared with the present method, which is costly, time consuming, and only allows the lender to reach a small portion of the broker and correspondent community.

2) It reduces costs and human errors by eliminating the need to manually check each loan lock registration calculation and manually record each broker and correspondents loan information.

3) It reduces costs by eliminating the need to fax product data sheets to the broker and correspondent community.

4) It reduces cost, eliminates human errors, and eliminates systemic errors associated with presenting adjustment criteria and calculating the final rate, points, cap and margin for loan products without the need to answer a large number of questions about the borrower as needed by "Rule Based" systems. This system is universal and accommodates any adjustment criterion, no matter how unusual or peculiar the criterion may be. This system uses all adjustment criteria whereas "Rule Based" systems will miss some adjustments and cannot be relied upon always to be accurate. It can be used by a lending institution to send loan product to its own branches instead of using faxes.

The system of the present invention also provides many compelling advantages for brokers and correspondents, including:

1) It reduces costs, risk, delay, and human error by enabling brokers to select, lock, and register a loan instantly, versus the current fax method, which requires brokers to search through many faxed rate sheets, find applicable products, identify adjustments, calculate adjustments, and fill out lock-in registration forms manually that then need to be faxed to the lender to register the loan product.

2) Brokers and correspondents can electronically search, find, and register loan products from any location, versus the current method of receiving data from a fixed location.

3) It reduces costs by enabling brokers and correspondents to conduct electronic searches of thousands of loan products almost instantaneously, versus the current method, which requires brokers and correspondents to search through paper product sheets manually.

4) It eliminates the costly delay of sending loan lock registration forms and receiving loan product information by fax.

5) Brokers and correspondents can receive full matrix information that pertains to each product selected.

6) Brokers and correspondents do not have long-distance phone charges to fax lock forms.

Thus, an improved system and method for transmitting loan rate information has been disclosed. The systems and methods disclosed may be applied to a variety of products, particularly including retail loans (e.g. auto loans), and in the case of simple retail loans, access to the loan database may be provided to the consumer via live web access, and applications may be taken and processed in the same general manner disclosed with respect to the mortgage examples provided above.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. An automated system for collecting and disseminating loan information over a network connection, comprising:

means for receiving loan data comprising daily loan data from lenders and for storing said loan data in a database;

means for providing to a user, over said network connection, a list of possible loan criteria;

means for receiving, over said network connection, a user's applicable loan criteria selected from said list of possible loan criteria;

means for using said applicable loan criteria and said loan data to create a list of loan adjustments, said loan adjustments comprising changes to costs, points, rates, margins, caps or life caps to be made if associated adjustment criteria are indicated as being applicable;

means for transmitting to said user over said network connection a quoted interest rate and said list of loan adjustments.

2. The automated system for collecting and disseminating loan information according to claim 1, wherein said loan adjustments comprise point adjustments, rate adjustments, or cap adjustments.

3. The automated system for collecting and disseminating loan information according to claim 1, wherein said loan data comprises data describing current interest rates, points, caps, or margins.

4. The automated system for collecting and disseminating loan information according to claim 1, further comprising means for interactively allowing a user to select, lock, and register a loan over said network connection.

5. The automated system for collecting and disseminating loan information according to claim 1, wherein said loan data further comprises loan product data which remains constant from day-to-day.

6. A method for collecting and disseminating loan information over a network connection, comprising the steps of:

providing a form to users via a network connection, said form including a series of possible adjustment criteria, adjustments to costs, points, rates, margins, caps or life caps associated with said criteria, and means associated with each of said adjustment criteria for allowing said user to indicate that a criterium is applicable;

receiving via said network connection user input indicating that particular criteria among said adjustment criteria are applicable;

providing to said user over said network connection a report showing user-selected applicable adjustments to terms of a quoted loan product.

7. The method for collecting and disseminating loan information over a network according to claim 6, further comprising the step of:

receiving over said network connection an indication that said user desires to lock said quoted loan product.

8. The method for collecting and disseminating loan information over a network according to claim 6, wherein said adjustments comprise adjustments to an interest rate, points, a cap, or a margin associated with said quoted loan product.

* * * * *

(12) EX PARTE REEXAMINATION CERTIFICATE (9933rd)
United States Patent
Dykes et al.

(10) Number: US 6,438,526 C1
(45) Certificate Issued: Nov. 12, 2013

(54) SYSTEM AND METHOD FOR TRANSMITTING AND PROCESSING LOAN DATA

(76) Inventors: Frederick T. Dykes, Great Falls, VA (US); Richard J. Heiston, Centreville, VA (US)

Reexamination Request:
No. 90/012,663, Sep. 15, 2012

Reexamination Certificate for:
Patent No.: 6,438,526
Issued: Aug. 20, 2002
Appl. No.: 09/277,771
Filed: Mar. 29, 1999

Related U.S. Application Data

(60) Provisional application No. 60/099,665, filed on Sep. 9, 1998.

(51) Int. Cl.
*G06Q 30/06* (2012.01)
*G06Q 40/00* (2012.01)
*G06Q 40/02* (2012.01)
*G06Q 40/08* (2012.01)
*G06Q 40/04* (2012.01)

(52) U.S. Cl.
CPC .............. *G06Q 30/06* (2013.01); *G06Q 40/025* (2013.01); *G06Q 40/08* (2013.01); *G06Q 40/00* (2013.01); *G06Q 40/04* (2013.01)
USPC .................................. 705/38; 705/35; 705/37

(58) Field of Classification Search
None
See application file for complete search history.

(56) References Cited

To view the complete listing of prior art documents cited during the proceeding for Reexamination Control Number 90/012,663, please refer to the USPTO's public Patent Application Information Retrieval (PAIR) system under the Display References tab.

*Primary Examiner* — Samuel Rimell

(57) ABSTRACT

An automated system for collecting and disseminating loan information over a network connection includes a server which receives loan data, including daily loan data, from lenders and stores the loan data in a database. A web server provides to users (e.g., brokers, correspondents, or retail loan customers) interactive web content including loan information and a list of loan criteria which would affect the quoted points, rate, cap, or margin associated with a particular loan. The web server receives a user's applicable loan criteria selected from the list of possible loan criteria. And uses that applicable loan criteria and the loan data from the lender to create a list of adjustments to the points, rate, cap or margin. A quoted interest rate and the list of applicable adustments are transmitted by the web server to the user.

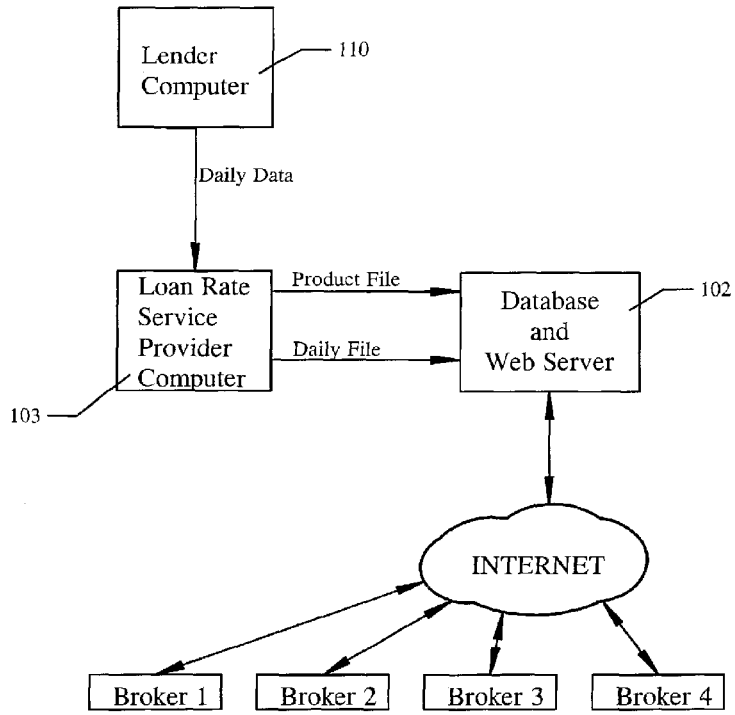

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*